United States Patent [19]
Brocart et al.

[11] 3,724,051
[45] Apr. 3, 1973

[54] DISTRIBUTORS COMPONENTS

[75] Inventors: René Brocart, Hellemmes-Lille; Henri Bourez, Lezennes, both of France

[73] Assignees: Manufacture D'Accumulateurs et D'Objets Moules, Paris; Societe Fulmen, Hauts-de-Seine, both of France

[22] Filed: July 6, 1971

[21] Appl. No.: 159,905

[30] Foreign Application Priority Data

July 3, 1970 France..................................7024810

[52] U.S. Cl.................................................29/204
[51] Int. Cl.............................................H01m 37/00
[58] Field of Search..............29/204 R, 204 D, 211 L

[56] References Cited

UNITED STATES PATENTS 3,210,833   10/1965   Budin et al............................29/204

Primary Examiner—Thomas H. Eager
Attorney—Richard C. Sughrue et al.

[57] ABSTRACT

An assembly machine allowing the selective distribution of battery components including pairs of magazines of plates, the magazines of each of the pairs being joined and being able to oscillate, in such a way that the tappets are able to selectively drive the plates contained in one or the other of the magazines of each of the pairs.

4 Claims, 2 Drawing Figures

DISTRIBUTORS COMPONENTS

BACKGROUND OF THE INVENTION

1. Field of the Invention

This invention has as its object an improvement in the distributors of battery components.

2. DESCRIPTION OF THE PRIOR ART

It is recalled here that in its American U.S. Pat. No. 3,210,833 of Oct. 12, 1965, the Compagnie Generale d'Electricite describes an automatic device for fitting calipers onto components for batteries, the said calipers routing pilings of components in a predetermined order towards the battery casings means to receive them.

More particularly, such components, that is, the positive plates, the negative plates, the separators as well as the intercalated wedges arranged in a series of specific magazines of each category, are later distributed according to a predetermined order by means of tappets in conjunction with a prehension device in order to place them on a conveyor belt.

Such an assemblage makes it thus possible to distribute identical groups having an uneven number of plates, the median and end plates having a same thickness.

Besides, in the device which is the object of the aforementioned patent, the final arrangement of said groups is executed at the moment of the placement in the casings.

SUMMARY OF THE INVENTION

The applicants have sought to increase the performance of such a device so that, in particular, the final arrangement of the groups of components is carried out at the very time of the fitting of the calipers.

Moreover, it is hopeful that such a device can achieve identical groups of components, including an even and uneven number of plates, the median and end plates being able to have different thicknesses.

Likewise, such a device must be able to achieve alternatingly groups having an even and uneven number of plates, the median and end plates having the same thickness.

This invention makes it possible to achieve the abovementioned performance.

It has as its goal an improved device which makes it possible to achieve groupings formed of components for batteries being able on the one hand to have different thicknesses, and on the other hand to be arranged in a different way.

The invention has as its object a device for the distribution of battery plates in which said plates are piled in magazines and are extracted from these magazines by means of tappets acting on the edge of the plate from the bottom of the piling characterized by the fact that each type of plates is arranged in two magazines joined together, means being foreseen to drive the said two magazines in an oscillating movement, in such a way that said tappets can selectively extract the plates contained in one or the other of the said two magazines.

BRIEF DESCRIPTION OF THE DRAWINGS

Other characteristics and advantages of the invention are seen from the description which follows, which is given by way of purely illustrative but not limiting example with respect to the attached drawings in which.

DESCRIPTION OF A PREFERRED EMBODIMENT

Figure 1:
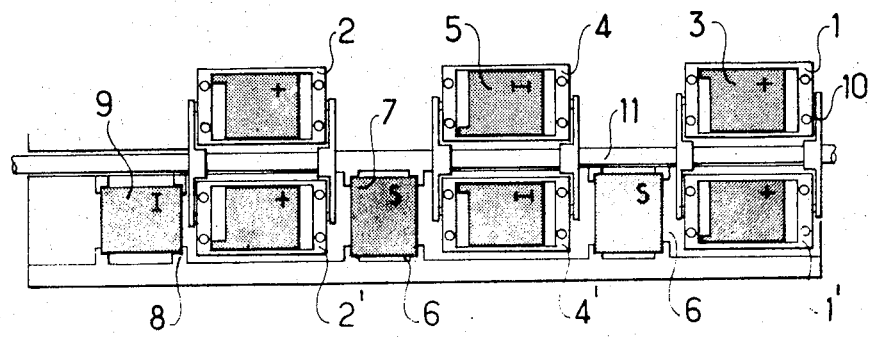
FIG. 1 shows an overhead view of the distributor device according to the invention.

Such as it is shown in FIG. 1, the distributor or assembly machine device includes several magazines, for example magazines 1, 1', 2, 2' meant to enclose the positive plates 3, magazines 4, 4' for the negative plates 5, magazines 6 in which separators 7 are arranged, and finally a magazine 8 of intercalated wedges 9. It is seen that magazines 1, 1' and 2, 2' of positive plates and magazines 4, 4' enclosing the negative plates are joined together in pairs. This is how FIG. 2 shows, for example, magazines 1 and 1' attached at the ends by a lever 10 driven in an oscillating movement by means of a median axis 11 joined to a programmed driving device (not shown).

Figure 2:
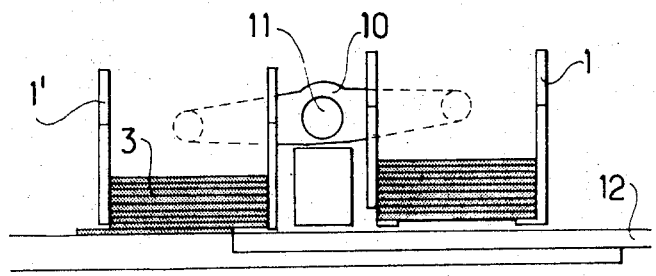
FIG. 2 shows a side view of the said device.

Also shown in FIG. 2 is the tappet 12 which makes it possible to release the plates by the bottom of the magazines.

It is thus understood that when the magazines occupy the position shown in FIG. 2, tappet 12 grasps the plates contained in magazine 1'.

Inversely, by driving of axis 11, magazine 1 declines, while magazine 1' rises thus allowing the free passage of the plates grasped in magazine 1 by tappet 12.

The performance of such a device is clearly seen from the attached drawings.

In particular, it is seen in FIG. 1 that it is possible to form groups of plates of which the noses are arranged symmetrically from one group to the other, so that the said groups are in final position for their joining. For this purpose, the plates occupy in the magazines a position such that the noses are symmetric with respect to axis 11. It is enough then to implement magazines 1, 2, 4 to form one of the groups, then magazines 1', 2', and 4' to form the following group.

Moreover, the form identical groups of plates in even or uneven number, of which the median and end plates have different thicknesses, it is enough to arrange in magazine 2 for example some end plates, having the thickness desired.

Likewise, it is also possible to alternately achieve groups having an even or uneven number of plates of the same thickness by alternately implementing magazines 2 or 2'.

Of course, the invention is not at all limited to the means of realization described and shown which has been given only by way of example.

In particular, without leaving the framework of the invention, modifications in detail can be made, arrangements can be changed, or certain means can be replaced by equivalent means.

What is claimed is:

1. In an assembly machine for the distribution of different types of battery plates in which said plates are piled in magazines and are extracted from these magazines by means of tappets acting on the edge of the plates from the bottom of the piling, the improvement comprising:

plates of each type being arranged in two magazines joined together, means driving said two magazines in an oscillating movement, and a tappet selectively movable into contact with an underlying plate of said piles for extracting plates contained in one or the other of said two magazines.

2. A member according to claim 1, wherein said drive means are formed by a lever joined by each of its ends to respective magazines and driven about an appreciably median axis.

3. A machine according to claim 1, wherein: in each pair of magazines, the noses of the plates are arranged symmetrically in respect to said axis.

4. A machine according to claim 2, wherein: in each pair of magazines, the noses of the plates are arranged symmetrically in respect to said axis.

* * * * *